United States Patent
Nelson et al.

(10) Patent No.: US 11,282,121 B1
(45) Date of Patent: Mar. 22, 2022

(54) AUGMENTED REALITY REAL-TIME PRODUCT OVERLAYS USING USER INTERESTS

(71) Applicant: Wells Fargo Bank, N.A., San Francisco, CA (US)

(72) Inventors: Corey Michael Nelson, Charlotte, NC (US); Spencer Holland Touchberry, Fort Mill, SC (US); November Michelle Champion, St. Louis, MO (US); Gwendoria M. Salley, Rock Hill, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/948,412

(22) Filed: Sep. 17, 2020

Related U.S. Application Data

(63) Continuation of application No. 15/858,477, filed on Dec. 29, 2017, now Pat. No. 10,878,474.
(Continued)

(51) Int. Cl.
*G06Q 30/00* (2012.01)
*G06Q 30/06* (2012.01)
(Continued)

(52) U.S. Cl.
CPC ..... *G06Q 30/0623* (2013.01); *G06Q 30/0203* (2013.01); *G06Q 30/0282* (2013.01); *G06Q 30/0641* (2013.01); *G06T 19/006* (2013.01)

(58) Field of Classification Search
None
See application file for complete search history.

(56) References Cited

U.S. PATENT DOCUMENTS 6,236,990 B1   5/2001   Geller et al.
7,003,503 B2   2/2006   Crosby et al.
(Continued)

OTHER PUBLICATIONS

IxDF Course Instructor, "An Introduction to Responsive Web Design" 2015. Retrieved from https://www.interaction-design.org/literature/article/an-introduction-to-responsive-web-design (Year: 2015).*

(Continued)

*Primary Examiner* — Naeem U Haq
(74) *Attorney, Agent, or Firm* — Schwegman Lundberg & Woessner, P.A.

(57) ABSTRACT

A computer-implemented system and method are provided for obtaining and providing product information to a user. The method comprises creating, with a processor of a purchase evaluation system, a user profile comprising a plurality of purchasing decision factors with each having a respective weight. The method further comprises receiving a product identifier that identifies a product being considered for purchase by a user, and then building or retrieving, in real-time, a product profile based on the product identifier that contains a plurality of product factors corresponding to the purchasing decision factors, each of which contain a value representing a score of the product's relationship to the respective product factor. The method then evaluates the product based on a function that incorporates the purchasing decision factors and the product factors, and creates display data for displaying the identified product and the product evaluation on a display.

20 Claims, 5 Drawing Sheets

Related U.S. Application Data

(60) Provisional application No. 62/441,077, filed on Dec. 30, 2016.

(51) Int. Cl.
*G06Q 30/02* (2012.01)
*G06T 19/00* (2011.01)

(56) References Cited

U.S. PATENT DOCUMENTS

| | | | | |
|---|---|---|---|---|
| 7,092,898 | B1* | 8/2006 | Mattick | G06Q 30/00 |
| | | | | 705/14.41 |
| 7,599,874 | B1 | 10/2009 | Repetto et al. | |
| 7,813,970 | B1 | 10/2010 | Brandwine et al. | |
| 8,165,891 | B2 | 4/2012 | Roberts | |
| 8,204,797 | B2 | 6/2012 | Wanker | |
| 8,418,915 | B1 | 4/2013 | Miller | |
| 8,977,611 | B2 | 3/2015 | Tseng | |
| 9,070,134 | B2 | 6/2015 | Gidwani et al. | |
| 9,183,583 | B2 | 11/2015 | Lin et al. | |
| 10,878,474 | B1 | 12/2020 | Nelson et al. | |
| 10,885,622 | B2* | 1/2021 | Subramanian | G06T 7/579 |
| 2005/0021389 | A1* | 1/2005 | Dias | G06Q 40/02 |
| | | | | 705/7.39 |
| 2006/0286518 | A1* | 12/2006 | Yoder | G06Q 10/00 |
| | | | | 434/236 |
| 2008/0071559 | A1 | 3/2008 | Arrasvuori | |
| 2008/0086387 | A1 | 4/2008 | O'rourke | |
| 2008/0270469 | A1 | 10/2008 | Myerson et al. | |
| 2009/0299822 | A1 | 12/2009 | Harari et al. | |
| 2010/0106575 | A1 | 4/2010 | Bixby et al. | |
| 2011/0029636 | A1 | 2/2011 | Smyth et al. | |
| 2011/0125659 | A1 | 5/2011 | Bernard et al. | |
| 2011/0218885 | A1 | 9/2011 | Manski et al. | |
| 2012/0101649 | A1 | 4/2012 | Rothschild | |
| 2012/0123953 | A1 | 5/2012 | Jabara | |
| 2012/0131013 | A1 | 5/2012 | Hobbs et al. | |
| 2012/0188155 | A1 | 7/2012 | Eun et al. | |
| 2012/0296845 | A1 | 11/2012 | Andrews et al. | |
| 2012/0323619 | A1 | 12/2012 | Risz et al. | |
| 2013/0054332 | A1 | 2/2013 | Ross et al. | |
| 2013/0061148 | A1* | 3/2013 | Das | H04W 4/185 |
| | | | | 715/738 |
| 2013/0113827 | A1* | 5/2013 | Forutanpour | G06F 16/50 |
| | | | | 345/633 |
| 2013/0221195 | A1 | 8/2013 | Kennedy | |
| 2014/0178029 | A1 | 6/2014 | Raheman et al. | |
| 2014/0236858 | A1 | 8/2014 | Abel et al. | |
| 2014/0337174 | A1* | 11/2014 | Lin | G06F 3/005 |
| | | | | 705/26.61 |
| 2015/0073907 | A1* | 3/2015 | Purves | G06Q 20/32 |
| | | | | 705/14.58 |
| 2015/0149373 | A1 | 5/2015 | Chhaya et al. | |
| 2016/0034909 | A1 | 2/2016 | Zhu et al. | |
| 2016/0117774 | A1 | 4/2016 | Bateman | |
| 2016/0253746 | A1* | 9/2016 | Morrison | G06Q 30/0625 |
| | | | | 705/26.62 |
| 2017/0123496 | A1 | 5/2017 | Wang et al. | |
| 2017/0132841 | A1* | 5/2017 | Morrison | G06K 9/00671 |
| 2017/0132842 | A1* | 5/2017 | Morrison | G06T 19/006 |
| 2017/0278135 | A1 | 9/2017 | Majumdar et al. | |
| 2018/0350148 | A1* | 12/2018 | George | G09B 5/02 |
| 2019/0205645 | A1* | 7/2019 | Bates | G06T 11/60 |
| 2020/0013206 | A1* | 1/2020 | Seely | G06F 40/169 |

OTHER PUBLICATIONS

U.S. Appl. No. 15/858,477, filed Dec. 29, 2017, Augmented Reality Real-Time Product Overlays Using User Interests.

"U.S. Appl. No. 15/858,477, Examiner Interview Summary dated Jun. 8, 2020".

"U.S. Appl. No. 15/858,477, Final Office Action dated Jun. 22, 2020".

"U.S. Appl. No. 15/858,477, Non Final Office Action dated Jan. 22, 2020".

"U.S. Appl. No. 15/858,477, Notice of Allowance dated Sep. 2, 2020", 8 pgs.

"U.S. Appl. No. 15/858,477, Response filed Apr. 22, 2020 to Non Final Office Action dated Jan. 22, 2020".

"U.S. Appl. No. 15/858,477, Response filed Aug. 24, 2020 to Final Office Action dated Jun. 22, 2020".

Ilinitch, Anne Y., et al., "Measuring corporate environmental performance", Journal of Accounting and Public Policy 17.4 (1999): 383-408., (1999), 26 pgs.

O'Routke, Dara, "The Power of Environmentally Conscious Shopping", NYTimes.com Jul. 30, 2012. Retrieved from https: www.nytimes.com roomfordebate Jul. 30, 2012 responsible-shoppers-but-bad-citizens the-power-of-environmentally-conscious-shopping (Year: 2012), (Jul. 30, 2012), 2 pgs.

* cited by examiner

AUGMENTED REALITY REAL-TIME PRODUCT OVERLAYS USING USER INTERESTS

CROSS-REFERENCE TO RELATED APPLICATION

This patent application is a continuation of U.S. patent application Ser. No. 15/858,477, filed Dec. 29, 2017, which claims the benefit of U.S. Provisional Patent Application No. 62/441,077, filed Dec. 30, 2016, entitled "AUGMENTED REALITY REAL-TIME PRODUCT OVERLAYS USING USER INTERESTS", each of which are incorporated by reference herein in their entirety.

TECHNICAL FIELD

Described herein are systems and methods that generally relate to assisting a user in purchasing a product by providing augmented reality (AR) real-time (RT) (collectively ARRT) product overlays based on weighted user interest factors.

BACKGROUND

A user making a product purchase may desire to take into account a number of factors prior to making the purchase. However, currently, nothing exists that easily and quickly enables a user to take into account specific factors that may be important to the user such as social and/or environmental factors.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Figure 1:
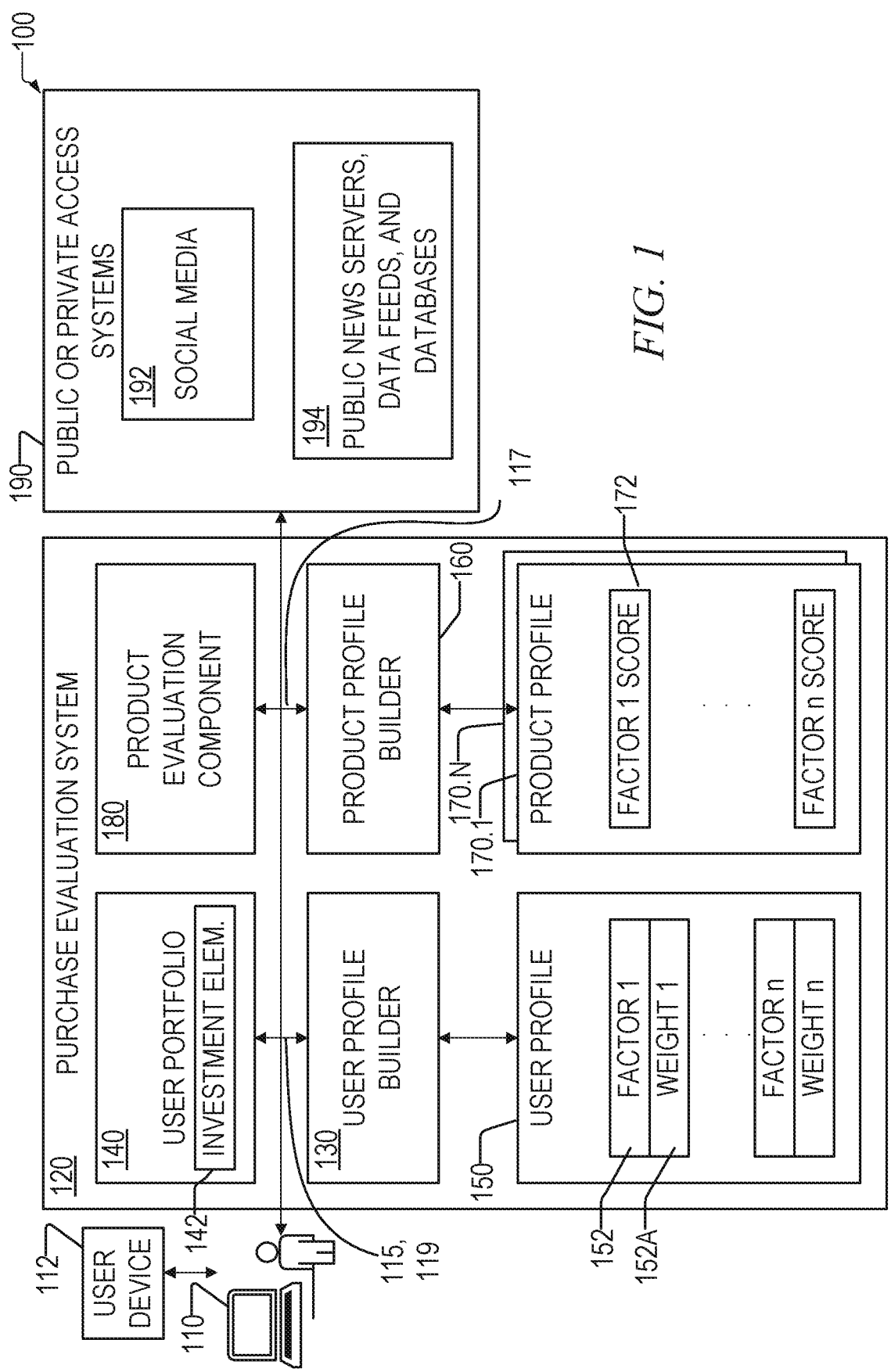
FIG. 1 is a block diagram that illustrates an example of a system that allows a user to make better-informed purchase decisions.

The system described herein is a tool and related method that may be used for assisting a user in making a purchase by providing a real-time evaluation of factors that the user may consider important in making a purchasing decision.

A computer-implemented method is provided for obtaining and providing product information to a user. The method comprises creating, with a processor of a purchase evaluation system, a user profile comprising a plurality of purchasing decision factors with each having a respective weight. The method further comprises receiving a product identifier that identifies a product being considered for purchase by a user. Using the product identifier, the method then builds or retrieves, in real-time, a product profile based on the product identifier that contains a plurality of product factors corresponding to the purchasing decision factors. Each of the product factors contain a value representing a score of the product's relationship to the respective product factor. The method then evaluates the product based on a function that incorporates the purchasing decision factors and the product factors, and creates display data for displaying the identified product and the product evaluation on a display.

A purchase evaluation system is also provided. The purchase evaluation system may comprise a hardware processor, a network interface connected to the hardware processor that may be connected to a network, and a non-volatile memory connected to the hardware processor and the network interface. The system memory stores a user profile comprising a plurality of purchasing decision factors with each having a respective weight. The system includes a user profile builder that is configured to receive user profile information related to a user, parse the user profile information into a plurality of purchasing decision factors, assign a purchasing decision factor weight for each of the purchasing decision factors based on the information related to the user, and store the plurality of purchasing decision factors and their respective weights in the user profile that is stored in the memory. The system also comprises a product profile builder that is configured to receive a product identifier, and determined (e.g., build or retrieve), in real-time, a product profile based on the product identifier that contains a plurality of product factors corresponding to the purchasing decision factors, each of which contain a value representing a score of the product's relationship to the respective product factor. The system also comprises a product evaluation component that is configured to evaluate the product based on a function that incorporates the purchasing decision factors and the product factors, and create display data for displaying the identified product and the product evaluation on a display.

A non-transitory computer-readable storage medium is also provided. It includes instructions that cause a computer to create a user profile comprising a plurality of purchasing decision factors with each having a respective weight, receive a product identifier that identifies a product being considered for purchase by a user, build or retrieve, in real-time, a product profile based on the product identifier that contains a plurality of product factors corresponding to the purchasing decision factors, each of which contain a value representing a score of the product's relationship to the respective product factor, evaluate the product based on a function that incorporates the purchasing decision factors and the product factors, and create display data to display the identified product and the product evaluation on a display.

FIG. 1 is a block diagram that illustrates an example of a system 100 that allows a user to make better-informed purchase decisions. It may comprise three primary entities: a user 110, a purchase evaluation system 120, and public systems 190 from which publicly available information may be obtained.

The example system described herein may be quite useful where, for example, the user 110 would like to purchase a product, but would like a better understanding of various factors related to the product or the manufacturing and distribution chain related to it. In addition to factors such as price, durability, and functionality, the user 110 may want to take into account various social and environmental factors associated with the product, such as whether the product was manufactured using resource conserving techniques or whether the product is pollution friendly.

The system 100 described herein may provide an ability allow a user 110 to consider various factors when making a product purchase, including social and environmental factors that may relate to their "core values" (e.g., stances on political issues, environment, religion, manufacturing overseas, and/or current investments) received or derived from various sources (e.g., surveys, social network posts, web site visits, investments, and behavioral modeling). The system 100 may then assist the user 110 in making a product purchase, taking into account these user factors.

In one configuration, the user may inquire about a single product, and the purchase evaluation system 120 may provide one or more values associated with that product so that the user can evaluate whether to make the purchase or not. In another configuration, two or more products may be compared side-by-side and the products may then be ranked based on a score or value, in a way that is discernable by the user 110.

Figure 2:
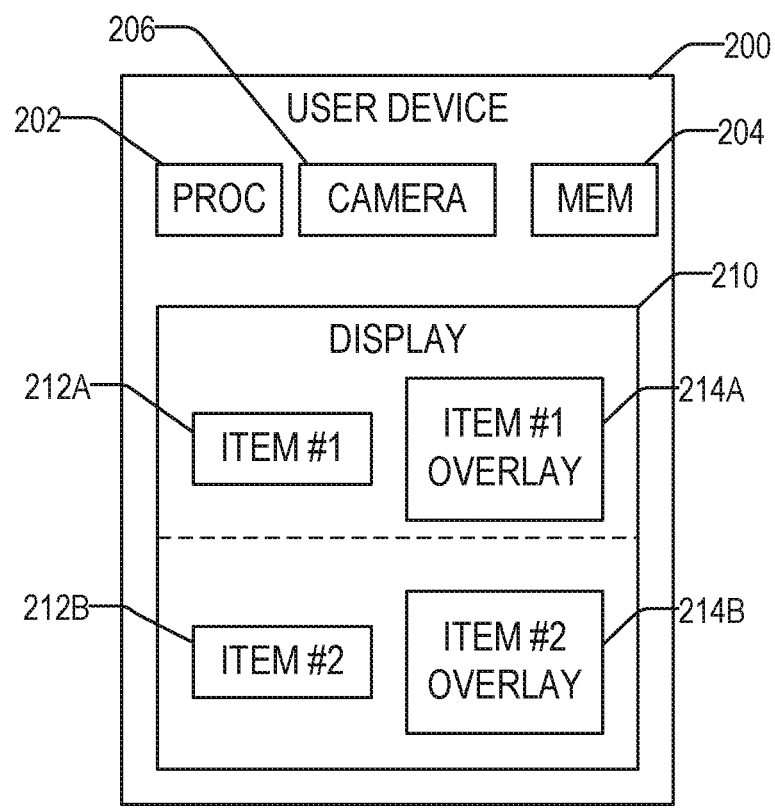
FIG. 2 is a block diagram of an example of a user device.

In order to assist the user 110 in making a purchase, the user may utilize a user device 112, such as a smart phone or tablet computer, which may include a camera and a display (as illustrated in FIG. 2, discussed in more detail below). The user device 112 may be designed to interact with the purchase evaluation system 120. In one configuration, the user device 112 may be designed as a client device and the purchase evaluation system 120 may be designed as a server device. Various features discussed below may be discussed in terms of applications or functionalities that reside on one of the client device (e.g., user device 112) or the server device (e.g., evaluation system 120)—however, the system is not to be considered limited, and the various applications or functionalities may be run on either the client device or the server device, based on design choice. In one configuration, an AR approach may be used such that the information (e.g., scoring, rating, ranking, or other metric(s)) associated with each displayed product is superimposed on the display on top of or adjacent to the displayed product, and the information may be provided in real-time, that is, shortly after the user identifies a particular product of interest. In the AR approach, a live view of a real world environment has its elements augmented or supplemented by computer-generated information.

The purchase evaluation system 120 may be initialized by using a user profile builder 130 to create a user profile 150 which may comprise a plurality of purchasing decision factors 152, each having an associated weight 152A. These factors 152 are factors having some degree of importance to the user 110 in making a purchase, such as environment, political affiliations, origin source, labor friendly, existing investments, religious leanings, prior purchases, etc. The user profile 150 could be stored in a memory on the user device 112, stored on the purchase evaluation system 120, or split between or replicated across both. Each factor 152 may be broken down into components (not shown) supporting the factor. The components could be considered a sub-factor, and each component may have a separate weighting (component weighting or sub-factor weighting). For example, and environment factor could be broken down into a pollution component, a renewable energy source component, a rain forest preservation component, etc. The components could be determined using any of the techniques described herein that relate to the factors themselves, and thus techniques applied to factors described herein can apply to constituent components as well.

In one straightforward configuration, the user profile builder 130 may collect information expressly and directly from the user 110, such as via a survey that asks a user, for example, to choose various factors from a list and then rank them or assign an importance/weighting value to them. The user-chosen factors 152 along with their weights 152A may then be stored in the user profile 150. In another configuration, a number of other sources can serve as an input to the user profile builder 130. The user's own investment portfolio (user portfolio 140) may be used as an input, such that various investment elements 142 (e.g., stocks and mutual funds) can be incorporated as factors 152.

Furthermore, public or private access systems 190 may be accessed to obtain information that may be relevant for identifying and creating the factors 152 and respective weights 152A used to build the user profile. For example, information from social media 192, such as Facebook and Twitter, may be used to identify the factors 152 and weights 152A of relevance to the user. To the extent that the social media 192 sources are publicly available, then the information may be accessed directly by the user profile builder 130. The user 110 may grant access permission to the purchase evaluation system 120 so that it may access the user's 110 private social media information.

The user profile builder 130 may consider user posts, likes, follows, and group memberships, as well as information from other social media users about the user 110 among other things, to determine factors 152 and weightings 152A. For example, if the user 110 frequently posts about climate change and other environmental issues, or they are following green organizations on Facebook, then the user profile builder 130 may predict that this user 110 would want their buying decisions for products to have the environment be one of the buying factors 152 with a relatively high weighting 152A. The determination of factors and weightings may be made using data mining techniques, such as looking at word frequencies, semantic analysis, links, etc.

The user 110 may also grant access to other private systems (banks, investment brokers, etc.) that may provide relevant input. When input from such sources is utilized in building the user profile 150, in one configuration, the derived factors 150 and their respective weights 152A may be presented to the user 110 to confirm or edit/adjust. The user's 110 own purchases (buying history) may serve as a further input into factors of the user's profile 150. For example, the user may indicate that the environment is an important factor, but if their purchases suggest that political factors or price consistently takes precedence in buying decisions, the user profile builder 130 may choose to lower the weighting (deemphasize) the environmental factor.

In one configuration, the user profile builder 130 may revise the user profile 150 based on any number of triggers. The triggers may be time-based, such that an expiration of some predefined time period causes the update trigger. Alternately, or additionally, the triggers may be event driven, such as a social media posting, product purchase, or change in investments. Based on the triggers, the user 110 may be asked if updates are needed, the public or private access systems 190 described above may be scanned, and/or the user portfolio 140 may be reviewed to possibly perform a re-ranking of the factors.

FIG. 2 is a block diagram of an example of a user device 200 that may comprise a processor 202 and memory 204 as well as a camera 206 and a display 210. Once the user profile 150 has been built or updated, the user may utilize their device 200 to evaluate one or more products using the product evaluation component 180. The product or products under consideration may be identified in various manners. In one embodiment, the user can directly enter identifying information for the product using a keyboard or voice recognition (not shown) associated with their device 200. The identifying information may, for example, be a description ("cell phone, brand X, model Y"), barcode, or QR code. Alternately, the camera 206 may be utilized to scan a barcode or QR code, scan the text of a box containing the product, or by image recognition by taking a picture of the product itself and then subjecting the picture to image recognition procedures to make a positive product identification.

The products may be identified by the user actually having the products in-hand, such as when the user 110 visits an actual brick-and-mortar store. However, this is not required, and a product may be identified based on a web search, recommendation, or using some other technique, regardless of whether the user 110 is in a brick-and-mortar store, is shopping on-line, or is able to provide the product identifier in some other manner.

Once the product(s) have been identified by the product evaluation component 180, additional information may be obtained about the product and a product profile 170 may be built by a product profile builder 160. In one configuration, the product identification triggers a real-time evaluation of the product evaluation component 180, which immediately instructs the profile builder 160 to create a product profile 170 if one does not already exist. The profile builder 160 may access information (defined herein as "product information") about the product or entities related to the product, such as the manufacturer and those entities in the distribution chain. The product information may be obtained from the public systems 190, such as manufacturer or distributor websites, review websites (or websites having reviews), such as Yelp and Amazon.com, or comments from other users of social media 192.

The product information may be parsed by the product profile builder 160 using data mining techniques described above to create a product factor 172 score, where the product factors 172 correspond to the user profile factors 152 described above. For example, if a user profile factor 152 is "environmental", then there may be a corresponding product factor 172 that is "environmental", and the product factor score of "72 out of 100" may describe how environmentally friendly the product is. The score could be a points-based score, a percentage score, or any other value that reflects the product information's relationship to the factor. As noted above, the product profile builder 160 may build the product profiles 170 in real-time and in response to the user 110 providing the product identifier. However, the purchase evaluation system 120 may also, in the interests of saving time, may maintain a database of product profiles 170.1-170.N (reference number 170 may be used herein to refer to either the collection of product profiles or to a representative product profile) in advance of a user identifying a particular product and analyzed on commonly specified user profile factors 152. In that way, time may be saved in performing the analysis when the user identifies the product.

Once the product profile builder 160 has obtained a product profile for the user-identified product, the product evaluation component 180 may be triggered to perform an evaluation of the product profile 170 against the user profile, thereby determining product evaluation information. The product evaluation information may include a value for the product as a whole, each of the factors 152, and/or each of the components making up the factors 152. By way of example, a product may be one produced by a company that uses green technologies to reduce energy consumption and reduce pollution. Thus, the product may have a high score on Factor 1, which is an environmental factor. However, the company CEO may be associated with a particular political party, and thus the product may score low on a politics factor. If the politics factor is given a low weight in the user profile 150, then this might not hurt the product's overall score significantly.

A representation of the identified product 212A (Item #1) may be shown on the display 210 of the user device 200. This display could be in graphical form, text form, or any other form that illustrates the product to the user. The product evaluation information may be displayed as on overlay 214A (Item #1 overlay), which may be on top of the product (which may be in a transparent form) or adjacent to the item display, as shown in FIG. 2. As noted above, a value could be to the product as a whole, or individual values could be displayed for each factor or components thereof. The display may be configurable by the user 110 such that the user could select particular factors or components to display (e.g., by specific identity, or generically, such as "top three weighted user profile factors"). The values may also be graphically represented, such as by color coding, bars, pie graphs, or any other mechanism for graphically indicating a value or strength this display format may be configurable by the user 110 as well, and may vary based on a display size of the user device 200.

In one configuration, such as that shown by FIG. 2, multiple products may be identified such that a comparison between them may be made. FIG. 2 illustrates two products being identified 212A, 212B, with their corresponding product overlays 214A, 214B. In this case, and based on the evaluation information, a ranking may be determined and the ranking may be represented by some distinguishing characteristic. For example, if two cell phones are being considered, the system may display the information for the cell phone receiving the higher ranking in green and the information for the cell phone receiving the lower ranking in red. Or some other form of indicia using color, size, graphic, or other rank-distinguishing feature may be utilized. A user may be able to specify the criteria on which the ranking should be based. For example, the user may specify that the ranking is based on the overall value for the two products, or the user may specify particular factors that should be used for the ranking. In one configuration, the factors may be presented in order of their weighting.

Even if the user 110 has only identified a single product for evaluation, the purchase evaluation system 120 may suggest alternative products, particularly of those alternative products have a higher score. If the user 110 is in a brick-and-mortar store and the purchase evaluation system 120 has a knowledge of the store's inventory, the product evaluation component 180 may alert the user to the presence of the alternate product in the store, and possibly even the location of that product within the store, if such product location information is available. Alternately, the product evaluation component 180 may indicate if such alternate products are available in other stores or on-line and provide their location to the user 110. The product evaluation component may also display a buy now button (or other similar user interface element) so that if the user 110 decides to purchase a particular product (e.g. on-line), a purchase may be immediately executed. The product evaluation component may also include a module or element that facilitates the actual purchase of a desired product and a save results button (or other similar user interface element) so that results returned for one or more identified products could be saved for later review.

In one configuration, the product evaluation component 180 allows the user 110 to drill into underlying information that went into the product profile and product factors so that they may see for themselves the bases for the factor values.

Figure 3:
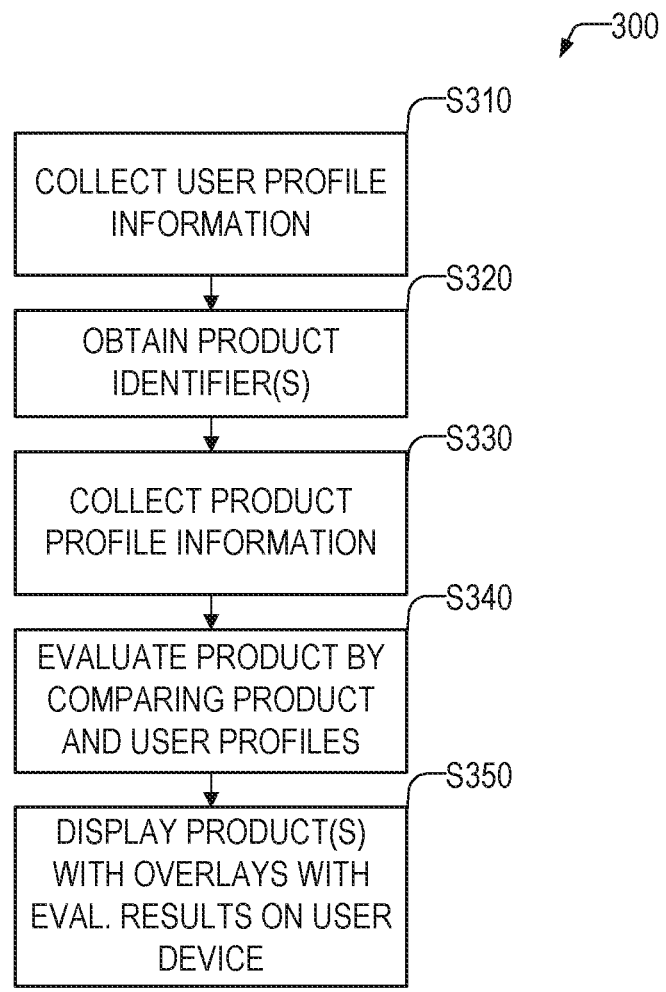
FIG. 3 is a flowchart that describes general process that may be used by the system.

FIG. 3 is a flowchart that describes a general process 300 that may be used by a system such as the system 100. In operation S310, user profile information may be collected using any of the mechanisms discussed above. In operation S320, one or more products being considered are identified to or received by the system. Based on the identifiers, in operation S330, product profile information is determine (e.g., built in real-time or retrieved in real-time if it had been previously collected and stored). In operation S340, the system evaluates the product by comparing the product profile with the user profile, including taking into account user factors and related weights. Finally, in operation S350, the product(s) is displayed to the user along with the evaluation results on the user's device, thereby permitting the user to make a better-informed decision about the product purchase.

Figure 4:
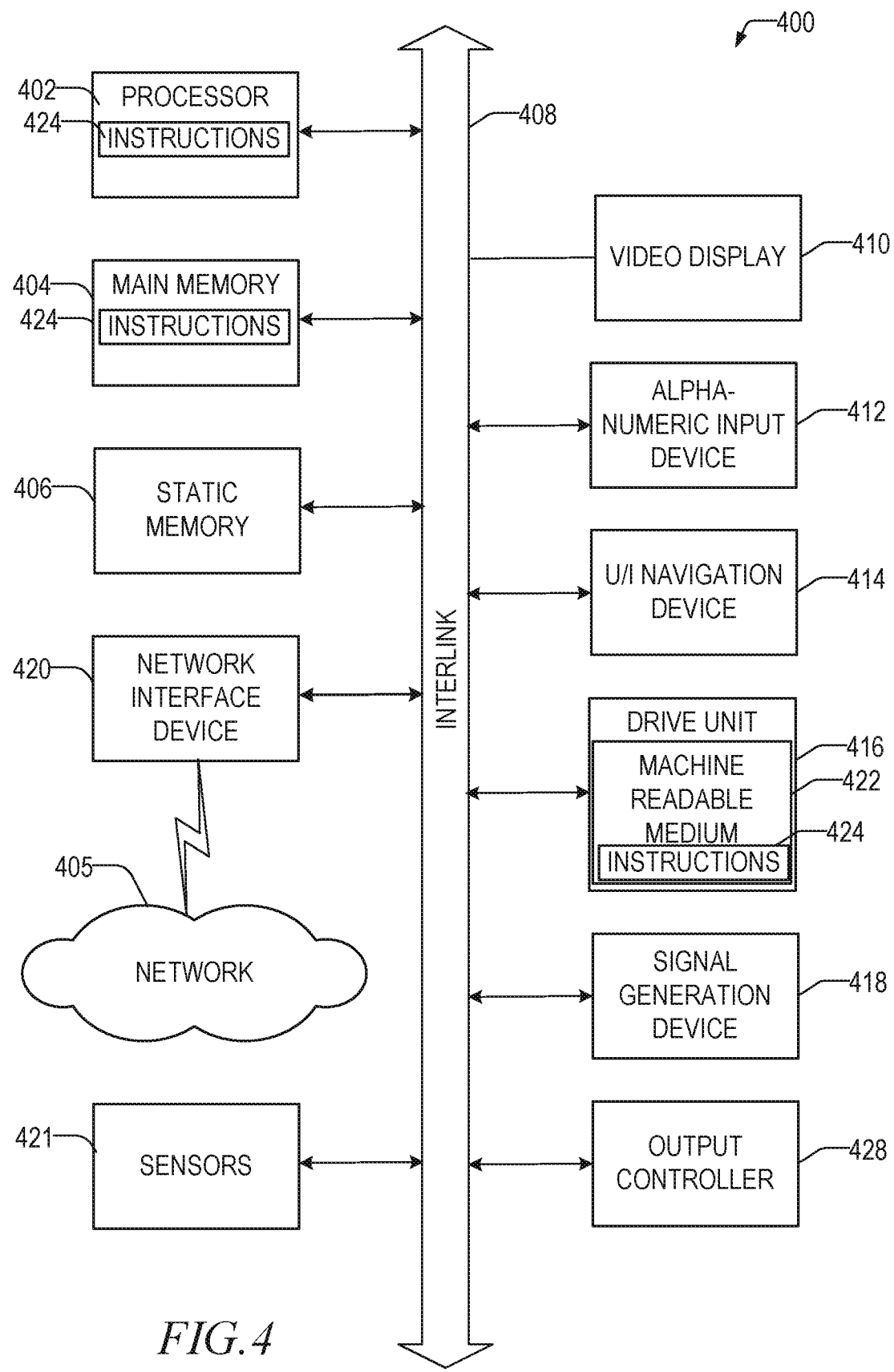
FIG. 4 is a block diagram illustrating a machine that may be a computer on which various processes described herein may be performed.

To describe some configurations in greater detail, reference is made to examples of hardware structures and interconnections usable in the designs of the present disclosure. FIG. 4 is a block diagram illustrating a machine 400 that may be a computer on which various processes described herein may be performed. For example, the user device 112 (or user device 200) may be an example of a machine 400, and the purchase evaluation system 120 and public or private access systems 190 may be examples of a machine 400.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410 (which may correspond to the display 210 described above), an alphanumeric input device 412 (e.g., a keyboard), and a user interface (UI) navigation device 414 (e.g., a mouse). In an example described herein, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or received over the communications network 405 using a transmission medium via the network interface device 420. The term "transmission medium" is defined herein to include any medium that is capable of storing, encoding, or carrying instructions for execution by the machine, and includes digital or analog communications signals or other medium to facilitate communication of such software. The communication interface between the user device 112, the purchase evaluation system 120, and the public or private access systems 190 may be a communications network 450 described below.

The machine 400 may communicate with one or more other machines 400 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 400. In an example, the network interface device 420 may include one or more physical jacks (e.g., Ethernet, coaxial, or phone jacks) or one or more antennas to connect to the communications network 426.

In an example, the network interface device 420 may include a plurality of antennas to wirelessly communicate using at least one of single-input multiple-output (SIMO), multiple-input multiple-output (NUM), or multiple-input single-output (MISO) techniques. In some examples, the network interface device 420 may wirelessly communicate using Multiple User MIMO techniques.

A wide variety of computing devices may constitute a machine 400, as described herein. The following list includes a variety of devices that may fit the definition of a machine 400: a personal data assistant (PDA), a cellular telephone, including a smartphone, a tablet computing device, a laptop computer, a desktop computer, a workstation, a server computer, a mainframe computer, and the like.

Figure 5:
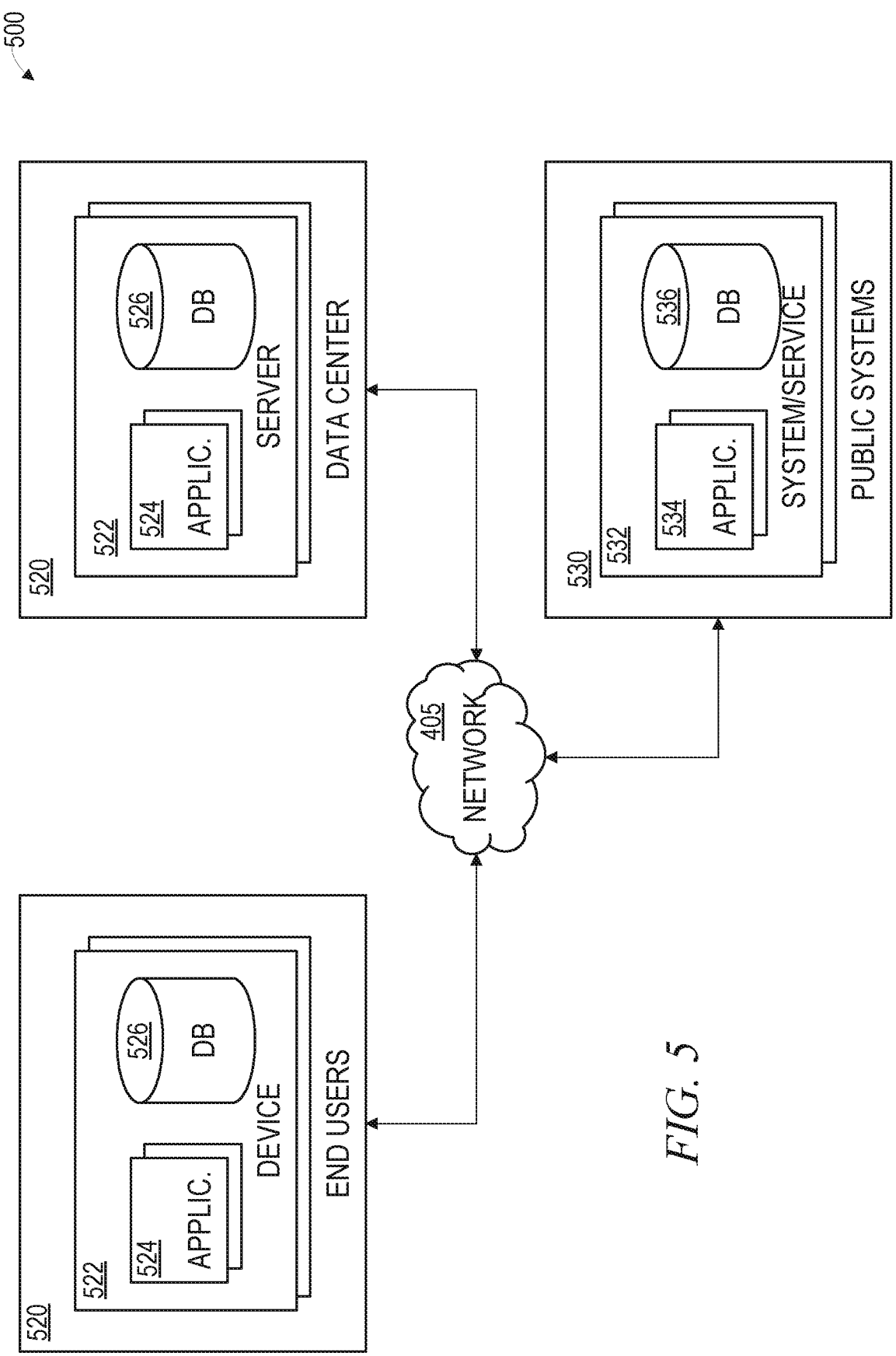
FIG. 5 is a block diagram of a distributed system that may include a client-server architecture or cloud computing system.

FIG. 5 is a block diagram of a distributed system 500 that may include a client-server architecture or cloud computing system. Distributed system 500 may have one or more end users 510, such as the user 110. An end user 510 may have various computing devices 512 (such as user device 112), which may be machines 400 as described above. The end-user computing devices 512 may comprise applications 514 that are either designed to execute in a stand-alone manner, or interact with other applications 514 located on the device 512 or accessible via the network 405. These devices 512 may also comprise a data store 516 that holds data locally, the data being potentially accessible by the local applications 514 or by remote applications.

The system 500 may also include one or more data centers 520. A data center 520 may be a server 522 or the like associated with a business entity that an end user 510 may interact with. The business entity may be a computer service provider, as may be the case for a cloud services provider, or it may be a consumer product or service provider, such as a retailer. The data center 520 may comprise one or more applications 524 and databases 526 that are designed to interface with the applications 514 and databases 516 of end-user devices 512. Data centers 520 may represent facilities in different geographic locations where the servers 522 may be located. Each of the servers 522 may be in the form of a machine(s) 400.

The system 500 may also include publicly available systems 530 that comprise various systems or services 532, including applications 534 and their respective databases 536. Such applications 534 may include news and other information feeds, search engines, social media applications, and the like. The systems or services 532 may be provided as comprising a machine(s) 400.

The end-user devices 512, data center servers 522, and public systems or services 532 may be configured to connect with each other via the network 405, and access to the network by machines may be made via a common connection point or different connection points, e.g. a wireless connection point and a wired connection. Any combination of common or different connections points may be present, and any combination of wired and wireless connection points may be present as well. The network 405, end users 510, data centers 520, and public systems 530 may include network hardware such as routers, switches, load balancers and/or other network devices.

Other implementations of the system 500 are also possible. For example, devices other than the client devices 512 and servers 522 shown may be included in the system 500. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 522.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the claims, along with the full scope of equivalents to which such claims are entitled.

The invention claimed is:

1. A computer-implemented method for obtaining and providing product information to a user, the method comprising:
using one or more processors:
receiving a product identifier that identifies a product being considered for purchase by a user; and
responsive to receiving the product identifier:
sending a request for information about the product to an external computing device;
receiving the information about the product from the external computing device;
determining, in real-time, a product evaluation based upon the information about the product and a plurality of purchasing decision factors of the user, the product evaluation including a total score and a breakdown, the breakdown comprising a plurality of sub scores, each sub score corresponding to one of the plurality of purchasing decision factors, the total score based upon the sub scores;
identifying a location on a display device where an image of the identified product is displayed;
determining a size of the display device;

automatically selecting, based upon the size of the display device, whether to display either the total score or the total score and the breakdown; and causing a display of the product evaluation on a display device in an augmented reality display, the display graphically overlaying a display of the product evaluation on top of, or placing the product evaluation adjacent to, the location of the image of the identified product, the displayed product evaluation displaying either the total score or the total score and the breakdown depending on the size of the display device.

2. The computer-implemented method of claim 1, wherein receiving the product identifier comprises receiving the product identifier from an input device.

3. The computer-implemented method of claim 2, wherein the input device comprises a camera, and wherein receiving the product identifier from the input device comprises one of: reading a barcode, reading a Quick Response (QR) code, or using image recognition on an image of the product.

4. The computer-implemented method of claim 2, wherein the input device is a text input device.

5. The computer-implemented method of claim 1, further comprising receiving a configuration from the user specifying a plurality of sub scores to display for the breakdown.

6. The computer-implemented method of claim 1, wherein the total score is a weighted summation of the plurality of sub scores.

7. The computer-implemented method of claim 1, further comprising:
using the one or more processors:
receiving a second product identifier that identifies a second product being considered for purchase by the user along with the product; and
responsive to receiving the second product identifier:
sending a second request for information about the second product to the external computing device;
receiving the information about the second product from the external computing device;
determining, in real-time, a second product evaluation based upon the information about the second product and the plurality of purchasing decision factors of the user, the second product evaluation including a second total score and a second breakdown, the second breakdown comprising a plurality of second sub scores, each second sub score corresponding to one of the plurality of purchasing decision factors; and
wherein causing the display of the product evaluation on the display device in the augmented reality display comprises additionally graphically overlaying the display of the second product evaluation next to the product evaluation.

8. A computing device for obtaining and providing product information to a user, the computing device comprising:
a processor;
a memory, storing instructions, which when executed by the processor, causes the computing device to perform operations comprising:
receiving a product identifier that identifies a product being considered for purchase by a user; and
responsive to receiving the product identifier:
sending a request for information about the product to an external computing device;
receiving the information about the product from the external computing device;
determining, in real-time, a product evaluation based upon the information about the product and a plurality of purchasing decision factors of the user, the product evaluation including a total score and a breakdown, the breakdown comprising a plurality of sub scores, each sub score corresponding to one of the plurality of purchasing decision factors, the total score based upon the sub scores;
identifying a location on a display device where an image of the identified product is displayed;
determining a size of the display device;
automatically selecting, based upon the size of the display device, whether to display either the total score or the total score and the breakdown; and
causing a display of the product evaluation on a display device in an augmented reality display, the display graphically overlaying a display of the product evaluation on top of, or placing the product evaluation adjacent to, the location of the image of the identified product, the displayed product evaluation displaying either the total score or the total score and the breakdown depending on the size of the display device.

9. The computing device of claim 8, wherein receiving the product identifier comprises receiving the product identifier from an input device.

10. The computing device of claim 9, wherein the input device comprises a camera, and wherein the operations of receiving the product identifier from the input device comprises one of: reading a barcode, reading a Quick Response (QR) code, or using image recognition on an image of the product.

11. The computing device of claim 9, wherein the input device is a text input device.

12. The computing device of claim 8, wherein the operations further comprise receiving a configuration from the user specifying a plurality of sub scores to display for the breakdown.

13. The computing device of claim 8, wherein the total score is a weighted summation of the plurality of sub scores.

14. The computing device of claim 8, wherein the operations further comprise:
receiving a second product identifier that identifies a second product being considered for purchase by the user along with the product; and
responsive to receiving the second product identifier:
sending a second request for information about the second product to the external computing device;
receiving the information about the second product from the external computing device;
determining, in real-time, a second product evaluation based upon the information about the second product and the plurality of purchasing decision factors of the user, the second product evaluation including a second total score and a second breakdown, the second breakdown comprising a plurality of second sub scores, each second sub score corresponding to one of the plurality of purchasing decision factors; and
wherein causing the display of the product evaluation on the display device in the augmented reality display comprises additionally graphically overlaying the display of the second product evaluation next to the product evaluation.

15. A non-transitory machine-readable medium storing instructions, which, when executed by a machine, cause the machine to perform operations comprising:

receiving a product identifier that identifies a product being considered for purchase by a user; and responsive to receiving the product identifier:

sending a request for information about the product to an external computing device;

receiving the information about the product from the external computing device;

determining, in real-time, a product evaluation based upon the information about the product and a plurality of purchasing decision factors of the user, the product evaluation including a total score and a breakdown, the breakdown comprising a plurality of sub scores, each sub score corresponding to one of the plurality of purchasing decision factors, the total score based upon the sub scores;

identifying a location on a display device where an image of the identified product is displayed;

determining a size of the display device;

automatically selecting, based upon the size of the display device, whether to display either the total score or the total score and the breakdown; and causing a display of the product evaluation on a display device in an augmented reality display, the display graphically overlaying a display of the product evaluation on top of, or placing the product evaluation adjacent to, the location of the image of the identified product, the displayed product evaluation displaying either the total score or the total score and the breakdown depending on the size of the display device.

16. The non-transitory machine-readable medium of claim 15, wherein receiving the product identifier comprises receiving the product identifier from an input device.

17. The non-transitory machine-readable medium of claim 16, wherein the input device comprises a camera, and wherein the operations of receiving the product identifier from the input device comprises one of: reading a barcode, reading a Quick Response (QR) code, or using image recognition on an image of the product.

18. The non-transitory machine-readable medium of claim 16, wherein the input device is a text input device.

19. The non-transitory machine-readable medium of claim 15, wherein the operations further comprise receiving a configuration from the user specifying a plurality of sub scores to display for the breakdown.

20. The non-transitory machine-readable medium of claim 15, wherein the total score is a weighted summation of the plurality of sub scores.

* * * * *